US012552959B2

(12) United States Patent
Temel et al.

(10) Patent No.: US 12,552,959 B2
(45) Date of Patent: Feb. 17, 2026

(54) AQUEOUS COATING COMPOSITION FOR CORROSION PROTECTION

(71) Applicant: ALLNEX AUSTRIA GmbH, Werndorf (AT)

(72) Inventors: Armin Temel, Graz-St Peter (AT); Florian Lunzer, Brussels (BE); Erik Bambach, Werndorf (AT)

(73) Assignee: ALLNEX AUSTRIA GMBH, Werndorf (AT)

( * ) Notice: Subject to any disclaimer, the term of this patent is extended or adjusted under 35 U.S.C. 154(b) by 101 days.

(21) Appl. No.: 18/282,109

(22) PCT Filed: Apr. 26, 2022

(86) PCT No.: PCT/EP2022/061035
§ 371 (c)(1),
(2) Date: Sep. 14, 2023

(87) PCT Pub. No.: WO2022/229174
PCT Pub. Date: Nov. 3, 2022

(65) Prior Publication Data
US 2024/0084167 A1 Mar. 14, 2024

(30) Foreign Application Priority Data
Apr. 27, 2021 (EP) .................................. 21170676

(51) Int. Cl.
| | |
|---|---|
| *C09D 175/08* | (2006.01) |
| *C08G 18/38* | (2006.01) |
| *C08G 18/58* | (2006.01) |
| *C08G 18/65* | (2006.01) |
| *C08G 18/80* | (2006.01) |
| *C09D 5/08* | (2006.01) |
| *C09D 7/20* | (2018.01) |

(52) U.S. Cl.
CPC ....... *C09D 175/08* (2013.01); *C08G 18/3825* (2013.01); *C08G 18/58* (2013.01); *C08G 18/65* (2013.01); *C08G 18/8058* (2013.01); *C09D 5/08* (2013.01); *C09D 7/20* (2018.01)

(58) Field of Classification Search
None
See application file for complete search history.

(56) References Cited

U.S. PATENT DOCUMENTS

| | | | | |
|---|---|---|---|---|
| 4,699,937 A * | 10/1987 | Loch | .................... | C09D 5/4434 528/121 |
| 5,177,161 A | 1/1993 | Gräff et al. | | |
| 5,264,497 A * | 11/1993 | Honig | .................... | C08G 71/00 528/45 |
| 5,292,833 A * | 3/1994 | Grahe | ................. | C08G 59/4057 525/449 |
| 5,338,788 A * | 8/1994 | Miyataka | ............... | C08K 5/205 524/197 |
| 5,559,195 A * | 9/1996 | McGee | ................. | C09D 157/04 525/379 |
| 5,576,063 A * | 11/1996 | Briggs | ............... | C08G 18/6229 427/386 |
| 5,994,479 A * | 11/1999 | Green | .................. | C09D 161/20 525/481 |
| 6,037,441 A * | 3/2000 | Ohrbom | ................. | C08K 5/005 528/367 |
| 6,080,825 A * | 6/2000 | Ohrbom | ............... | C09D 201/06 525/481 |
| 6,166,148 A * | 12/2000 | Ohrbom | ................. | C08K 5/005 525/326.7 |
| 2003/0181576 A1* | 9/2003 | Melchiors | ............ | C08G 18/633 524/553 |
| 2004/0054083 A1* | 3/2004 | Campbell | .......... | C08G 18/7843 525/157 |
| 2004/0238362 A1* | 12/2004 | December | ................ | C09D 7/00 204/501 |
| 2006/0173120 A1* | 8/2006 | Baumgart | .............. | C08G 18/80 524/502 |
| 2008/0124532 A1* | 5/2008 | Menovcik | ................ | C09D 5/00 525/437 |
| 2008/0194843 A1* | 8/2008 | Gonzalez | ................. | C09D 7/63 549/219 |
| 2010/0129659 A1 | 5/2010 | Nemoto et al. | | |

FOREIGN PATENT DOCUMENTS

| | | |
|---|---|---|
| DE | 197 56 749 | 10/1999 |
| EP | 1805260 | 5/2006 |
| EP | 1 840 486 | 10/2007 |
| EP | 1 923 375 | 5/2008 |
| WO | 03058345 | 7/2003 |
| WO | 2013/191826 | 12/2013 |
| WO | 2015/093299 | 6/2015 |
| WO | 2016/158049 | 10/2016 |
| WO | 2018/130700 | 7/2018 |
| WO | WO-2018130700 A1 * | 7/2018 ............. C08G 59/08 |

OTHER PUBLICATIONS

International Search Report and Written Opinion of the International Searching Authority dated Jun. 20, 2022 in International (PCT) Application No. PCT/EP2022/061035 (10 pages).

* cited by examiner

*Primary Examiner* — Alexander M Weddle
(74) *Attorney, Agent, or Firm* — Wenderoth, Lind & Ponack, L.L.P.

(57) ABSTRACT

The invention relates to an aqueous resin dispersion comprising a mixture of a hydrophilically modified epoxy-based resin, a crosslinker, and a co-crosslinker. The present invention also relates to an aqueous coating composition, comprising said resin dispersion, providing improved corrosion and discolouration resistance; to a process for the preparation of the aqueous resin dispersion and the coating composition; and to the use of the coating composition for coating metal substrates.

22 Claims, No Drawings

AQUEOUS COATING COMPOSITION FOR CORROSION PROTECTION

FIELD OF THE INVENTION

The present invention relates to an aqueous resin dispersion and to an aqueous coating composition, comprising said resin dispersion, providing improved corrosion and discolouration resistance; to a process for the preparation of the aqueous resin dispersion and the coating composition; and to the use of the coating composition for coating metal substrates.

BACKGROUND ART

Most metals, with the exception of noble metals or those metals that form coherent oxide layers such as aluminum, are provided with coating films when exposed to ambient conditions to prevent, or at least retard, corrosion. Application of a coating film onto a metal surface provides a barrier between the metal substrate and a damaging environment if there is sufficient adhesion of the coating film to the metal substrate, and if the permeability of the coating film for oxygen and water is low. Among coating films, paints in liquid form or powder form play an important role. An aspect which has to be considered when selecting a coating material is how to avoid constituents in the coating composition that can react with the metal surface, and that can thus possibly damage the metal substrate, for example chloride ions which may provide a seed for future corrosive attack.

Many organic polymers are suitable for forming coating films on a metal surface. It is desired that these films have a sufficient hardness, sufficient adhesion as pointed out supra, and also sufficient elasticity to enable the coating film to follow possible deformations of the coated metal items. Epoxy resins are one of the most-used materials in the formulation of corrosion-protection paints (High-Performance Coatings, 2008, ed. A. S. Khanna, "the word epoxy has become synonymous with anti-corrosion in today's industrial environment"). Reaction products made from epoxy resins and amines have become the standard material in cathodic electrocoating of vehicle bodies.

In WO 2015/093 299 A1, an aqueous resin composition (D) is disclosed which is obtained by dispersing a vinyl ester resin (A) and a urethane resin (B) having an aromatic ring in an aqueous medium (C), and adding thereto a carbodiimide crosslinking agent (E). The vinyl ester resin (A) is made by reacting a polymerisable ethylenically unsaturated acid compound (a2) with at least one epoxy resin (a1) selected from the group consisting of a novolac type epoxy resin and a bisphenol type epoxy resin. The urethane resin (B) is obtained by reacting a polyol (b1-1) having an aromatic ring and a polyol (b1-2) having a hydrophilic group which is preferably an anionic group, with a polyisocyanate (b2). The carbodiimide crosslinking agent (E) preferably has two or more carbodiimide groups per molecule.

In US 2010/0 129 659 A1, a coated product is disclosed made by a 3-coat 1-bake method; the method including the steps of forming cured coating film (A1) from a cationic electrodeposition coating composition (A) on a metal object to be coated; forming a first colored coating film (B1) by applying thereon a first coloured aqueous coating composition (B); forming a second colored coating film (C1) by coating a second colored aqueous coating composition (C) on uncured first colored coated film (B1), forming a clear coating film (D1) by applying a clear coating composition (D) on the uncured second colored coating film (C1); and simultaneously curing uncured first colored coated film (B1), uncured second colored coating film (C1), and uncured clear coating film (D1). The cationic electrodeposition coating composition (A) contains cationic amino group-containing modified epoxy resin (a1) wherein the modification is made by addition of a xylene formaldehyde resin which is made by condensing xylene and phenols with formaldehyde in the presence of an acidic catalyst, which modification renders plasticity and hydrophobicity to the epoxy resin.

In WO 2013/191 826 A1, an aqueous mixture is disclosed which comprises an aqueous polyolefin dispersion comprising the melt blending product of one or more base polymers and one or more stabilizing agents in the presence of water and optionally one or more neutralising agents, wherein the polyolefin dispersion has an average volume particle size diameter in the range of from 400 nm to 1500 nm, and a pH range from 8 to 11; and one or more crosslinking agents selected from the group consisting of phenol-formaldehyde resins, hydroxyalkylamide resins, amino-formaldehyde resins, epoxy group containing resins, and combinations thereof.

EP 1 805 260 A1 is related to a self-bonding coating composition for the production of electrical steel sheets cores comprising A) 100 parts per weight of at least one epoxy resin based on bisphenol-A-type, bisphenol-F-type or mixtures thereof, 100% of solids, B) 0.1 to 200 parts per weight of nano particles having an average radius ranging from 2 to 600 nm, C) 0 to 25 parts per weight of at least one curing agent selected from the group consisting of dicyandiamide, blocked isocyanate and Lewis acid or selected from the group consisting of phenolic resin, carboxylic acid, anhydride and Lewis acid, 100% of solids, D) 0.1 to 10 parts per weight of at least one additive, and E) 50 to 200 parts per weight of water or at least one organic solvent.

WO 2018130700 A1 discloses an aqueous resin dispersion D comprising a mixture of a hydrophilically modified epoxy-based resin P and a resole crosslinker R, and a co-crosslinker E, wherein the hydrophilically modified epoxy-based resin P is made in a reaction or a sequence of reactions which includes at least one step where an advancement reaction is conducted.

U.S. Pat. No. 5,177,161 A discloses can coating applications comprising water-reducible paints based on condensation products of bisphenol A epoxy resins of type 7 and phenol-based novolaks which were methylated and afterwards, reacted with sodium monochloroacetate, and then dispersed in water. The epoxy resin and novolak moieties are connected via an ether linkage.

Other water-reducible can coating resins which are based on addition products of carboxylated novolaks A and epoxy resins B have been known from DE 197 56 749 B4. These addition products have at least one ester group per molecule which is formed by reaction of a carboxyl group of the novolak A and an epoxide group of the epoxy resin B. These products have lighter color than those according to U.S. Pat. No. 5,177,161 A.

In the art up to now either the corrosion resistance of steel plates with coating films according to the state of the art is still not satisfactory or the corrosion resistant coating films discolor upon stoving at temperatures above 160° C. In the worst case, both, corrosion protection and discoloration resistance upon stoving are insufficient.

The use of resoles as main crosslinker for metal coatings is widely spread to protect the inner surface of food cans from the corrosive attack of the filling goods. For such applications the tendency of resoles to change color when cured at temperatures between 150 and 250° C. is known and not regarded as an issue. Also if a metal coating is pigmented with dark colored pigments the yellowing behavior of resole crosslinkers is not a technical hurdle. However, for light pigmented metal coatings or clear coatings that should not change their color upon oven cure, the use of resoles is problematic. Therefore there remains a need for coating compositions with a high level of metal protection and a low tendency of discoloration upon cure at elevated temperature.

Aim of the Invention

The present invention aims to provide an aqueous dispersion for coating compositions that do not present the drawbacks of the prior art.

It is the aim of the present invention to provide coating compositions with improved corrosion resistance properties and improved discoloration resistance, at high stoving temperatures, compared to the state of the art coating systems.

SUMMARY OF THE INVENTION

The present invention discloses an aqueous resin dispersion D comprising a mixture of a hydrophilically modified epoxy-based resin P, a blocked isocyanate crosslinker IB, and a co-crosslinker E; wherein the hydrophilically modified epoxy-based resin P comprises 1-hydroxy-2-phenoxy-ethyl groups; and wherein the co-crosslinker E is selected from the group consisting of
  a compound E1 having at least two hydroxyl groups that react with acid compounds present in the coating composition at elevated temperature above 80° C. under ester formation and liberation of water, and
  an ester E2 with at least two ester groups formed by an at least dihydric alcohol E22 and an acid E21 which acid is unstable at elevated temperature above 80° C.

Preferred embodiments of the present invention disclose one or more of the following features:
  the blocked isocyanate crosslinker IB preferably is the reaction product of a polyisocyanate and a hydroxyl functional carbamate C, said hydroxyl functional carbamate C being the reaction product of cyclic organic carbonates with aliphatic monoamines, diamines, triamines, tetraamines and/or alkanolamines, said amines having at least primary or secondary amino groups;
  the hydroxyl functional carbamate C preferably is 2-hydroxyethyl bis(2-hydroxyethyl)carbamate or 2-hydroxypropyl bis(2-hydroxyethyl)carbamate;
  the co-crosslinker E1 preferably is a beta-hydroxyalkyl-amide having the formula:

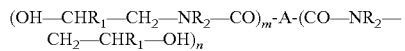

wherein:
    $R_1$ is hydrogen or C1-C5 alkyl;
    $R_2$ is hydrogen, C1-C5 alkyl or $CH_2$—$CHR_1$—OH;
    A is a chemical bond or a polyvalent organic radical derived from saturated, unsaturated or aromatic hydrocarbon radicals including substituted hydrocarbon radicals containing from 2 to 20 carbon atoms; and
    m is an integer having a value of 1 to 2; n is an integer having a value of 0 to 2, and m+n is at least 2;
  the co-crosslinker E1 preferably is N,N,N',N'-tetrakis-(2-hydroxyethyl)-adipamide or N,N,N',N'-tetrakis-(2-hydroxypropyl)-adipamide;
  the hydrophilically modified epoxy-based resin P is a non-ionically modified epoxy-based resin Pn being the reaction product of a diepoxide, a dihydric aromatic compound and an epoxy-functional non-ionic emulsifier F; said epoxy functional non-ionic emulsifier F being;
    an epoxide functional polyoxyalkylene homopolymer or copolymer; and/or
    an epoxide functional sugar alcohol; and/or
    the reaction product of a hydroxyl functional polyoxyalkylene homopolymer or copolymer or a sugar alcohol segment with an at least difunctional epoxide compound;
  wherein:
    the polyoxyalkylene homopolymer is polyoxyethylene or polyoxypropylene;
    the polyoxyalkylene copolymer is a polyoxyethylene-propylene copolymer;
    the polyoxyalkylene homopolymers and copolymers comprise from 20 to 150 C2-C3 oxyalkylene units;
  the non-ionically modified epoxy-based resin Pn preferably is characterized by an epoxide equivalent weight (EEW) comprised between 200 and 2,000 g/equiv.;
  the aqueous resin dispersion D preferably comprises:
    between 40 and 90% by weight of hydrophilically modified epoxy-based resin P, preferably being a non-ionically modified epoxy-based resin Pn;
    between 5 and 55% by weight of blocked isocyanate crosslinker IB; and
    between 0.1 and 5% by weight of co-crosslinker E, preferably E1, more preferably a beta-hydroxyalkylamide;
  based on the total weight of P, IB and E;
  the aqueous resin dispersion D preferably comprises one or more catalyst(s) selected from the group consisting of salts, chelate compounds and organometallic compounds of elements of groups 4, 7, 8, 9, 12, 13, 14 and 15 and of period 4, 5 and 6 of the periodic table of elements according to the new IUPAC naming system, and strong amines,
  the hydrophilically modified epoxy-based resin P and/or the blocked isocyanate crosslinker IB in the aqueous resin dispersion D according to the invention are obtained from renewable feedstock and in total have a bio-based carbon content of more than 20% by weight of total carbon content of epoxy-based resin P and blocked isocyanate crosslinker IB, the bio-carbon content being determined using the ASTM D6866-20 standard, or the epoxy-based resin P and/or the blocked isocyanate crosslinker IB are derived from recycled monomers, preferably the hydrophilically modified epoxy-based resin P and/or the blocked isocyanate crosslinker IB in the aqueous resin dispersion D according to the invention are obtained from renewable feedstock and in total have a bio-based carbon content of more than 20% by weight of total carbon content of epoxy-based resin P and blocked isocyanate crosslinker IB, the bio-carbon content being determined using the ASTM D6866-20 standard.

The present invention further discloses a coating composition comprising between 35 and 55% by weight of non-volatile compounds and from 45 to 65% by weight of water and co-solvents selected from the group consisting of alcohols, ketones, esters, glycols, glycol ethers, and glycol esters, and mixtures thereof; said coating composition preferably further comprising one or more additives selected from the group consisting of defoamers, levelling agents, coalescing agents, flow modifiers, biocides, pigments, rheology additives, and wetting agents.

The present invention further discloses a method for producing a coated metal substrate comprising the subsequent steps of:
  applying the coating composition on at least one side of the, optionally pretreated and/or primer comprising, metal substrate, at a coating thickness adjusted to obtain a dry coating thickness of at least 10 µm;
  flashing off water and co-solvents at a temperature of at least 20° C. for at least 1 minute;
  stoving the applied coating composition at a temperature of at least 100° C. for a period of at least 20 seconds, to form the metal substrate coated with the cross-linked coating layer.

The present invention further discloses the use of the coating composition for coating a metal substrate.

DETAILED DESCRIPTION OF THE INVENTION

The aqueous resin dispersion D of the present invention comprises a mixture of a hydrophilically modified epoxy-based resin P, a crosslinker IB, and a co-crosslinker E, wherein the hydrophilically modified epoxy-based resin P comprises 1-hydroxy-2-phenoxy-ethyl groups (the 1-hydroxy-2-phenoxy-ethyl group being an ether linkage).

More particularly, the aqueous resin dispersion D of the present invention comprises a mixture of a hydrophilically modified epoxy-based resin P, a crosslinker IB, and a co-crosslinker E, wherein the hydrophilically modified epoxy based resin P is made in a reaction or a sequence of reactions which includes at least one step where an advancement reaction is conducted, the advancement reaction being a reaction where a phenolic compound having phenolic hydroxyl groups is reacted with a compound having at least two reactive epoxide groups, resulting in the formation of 1-hydroxy-2-phenoxy-ethyl groups (the reaction of the epoxy group and the phenolic hydroxyl group resulting in the formation of the 1-hydroxy-2-phenoxy-ethyl group or ether linkage).

Alternatively and preferred, where possible, the hydrophilically modified epoxy-based resin P and/or the crosslinker IB are obtained from renewable feedstock or from recycled monomers, preferably, the hydrophilically modified epoxy-based resin P and/or the crosslinker IB are obtained from renewable feedstock and in total have a bio-based carbon content of more than 20% by weight of total carbon content of epoxy-based resin P and isocyanate crosslinker IB, the bio-carbon content being determined using the ASTM D6866-20 standard.

The hydrophilically modified epoxy based resin P is selected from the group consisting of an at least partially neutralized anionically modified epoxy based resin Pa, a non-ionically modified epoxy based resin Pn, and an at least partially neutralized anionically and non-ionically modified epoxy based resin Pan.

One of the characteristics of the hydrophilically modified epoxy-based resin P of this invention is that all variants Pa, Pn and Pan are always made by a reaction or by a sequence of reactions which includes at least one advancement reaction, also referred to as fusion reaction, viz., a reaction where a phenolic compound having phenolic hydroxyl groups is reacted with a compound having at least two epoxide groups.

The at least partially neutralized anionically modified epoxy based resin Pa comprising anionic groups is made by at least partially neutralizing the acid groups of the product obtained through a first multi-step process or through a second multi-step process.

The first multi-step process for the preparation of the at least partially neutralized anionically modified epoxy-based resin Pa comprises steps a1, b1, c1, d1, e1, and f1 wherein:
  in step a1, a novolak is prepared from a phenol and formaldehyde under acid catalysis, and unreacted phenol is separated from the reaction product of step a1;
  in step b1, the novolak of step a1 is subjected to an advancement reaction under catalysis by adding an epoxy resin having on average at least two functional epoxide groups per molecule, preferably an epoxy resin based on Bisphenol A;
  in step c1, the reaction product of step b1 is dissolved in an organic solvent to form a solution, wherein the solvent is selected from the group consisting of linear or branched aliphatic alcohols, linear or branched aliphatic ethers, linear or branched aliphatic ketones, and mixtures of these with aromatic hydrocarbons;
  the solution of the reaction product of step c1 is then reacted in step d1 with formaldehyde in the presence of alkali, to form methylol compounds;
  in step e1, after addition of further alkali, a halogenalkanoic acid, preferably 2-chloroacetic acid, is added to the product of d1, and after complete reaction of the halogenalkanoic acid, the reaction product of step e1 is purified by acidification with aqueous acid, the organic layer which contains the reaction product is separated and the separated solution is washed with distilled water; and
  in step f1, the purified reaction product of step e1 is freed from solvent by distillation under reduced pressure, and water and a tertiary amine as neutralisation agent are then added to obtain an aqueous solution where only small amounts of the solvents remain.

The second multi-step process for the preparation of the at least partially neutralised anionically modified epoxy-based resin Pa comprises steps a2, b2 and c2 wherein:
  in step a2, an ester of a phosphorus-based acid and an epoxide-functional compound, having at least one epoxide group per molecule, is prepared, wherein the phosphorus-based acid has at least two acidic hydrogen atoms per molecule, and is selected from the group consisting of inorganic acidic phosphorus compounds, and organic acidic phosphorus compounds, and the epoxide-functional compound is an epoxide compound having at least two epoxide groups per molecule, and wherein the reaction is conducted in a way that the ester produced by the reaction of step a2 has a specific amount of epoxide groups which is not higher than 0.1 mole/kg, and on average, at least one acidic hydrogen atom per molecule;
  in step b2, an advancement reaction is conducted with an at least difunctional epoxide and an aromatic dihydroxy compound, in the presence of a catalyst, to yield a polyether compound having epoxide groups;
  in step c2, the polyether compound of step b2 is dissolved in a solvent, and the ester, made in step a2, is added under stirring until a homogeneous mixture is obtained, which mixture is then freed from solvents by distillation under reduced pressure.

The phosphorus-based acid, used in step a2, has at least two acidic hydrogen atoms per molecule, and is selected from the group consisting of inorganic acidic phosphorus compounds, and organic acidic phosphorus compounds. The former group comprises ortho-phosphoric acid $H_3PO_4$, diphosphoric acid $H_4P_2O_7$, triphosphoric acid $H_5P_3O_{10}$ and their higher homologues (oligomers), phosphorous acid $H_3PO_3$, diphosphorous acid $H_4P_2O_5$ and their higher homologues, and hypophosphorous acid $H_3PO_2$ and their higher homologues. Particularly preferred are ortho-phosphoric acid, mixtures of di- and higher oligomers of ortho-phosphoric acid, phosphorous acid, and higher oligomers thereof. The latter group comprises phosphonic acids which are selected from the group consisting of alkanephosphonic acids, $R^1$—$PO_3H_2$, aromatic phosphonic acids $R^2$—$PO_3H_2$, and the corresponding phosphonous acids $H_3PO_2$, where $R^1$ is a linear, branched or cyclic alkyl having from one to twenty carbon atoms, and $R^2$ is an optionally substituted aromatic group having from six to twenty carbon atoms. Particularly preferred are methanephosphonic acid and benzenephosphonic acid.

The epoxide-functional compound, used in step a2 is preferably a glycidylether of a phenolic compound, preferably bisphenol A diglycidylether or bisphenol F diglycidylether, or an oligomeric or polymeric epoxy resin based on these bisphenols.

The non-ionically modified epoxy based resin Pn is made by a process comprising steps a3 and b3 wherein
  in step a3 an emulsifier F is prepared from a nonionic portion comprising a polyoxyethylene homopolymer or copolymer segment or a sugar alcohol segment, and a non-hydrophilic and compatibilising portion comprising building blocks derived from epoxide compounds which are at least difunctional, preferably Bisphenol A diglycidyl ether or oligomers thereof, by coupling of the at least difunctional epoxide compounds with hydroxy-functional polyoxyethylene homopolymers or hydroxy-functional polyoxyethylene copolymers or with sugar alcohols catalysed with strong Brønsted acids or Lewis acids, preferably tetrafluoroboric acid $HBF_4$, boron trifluoride $BF_3$, or its complexes with dialkylethers or amines. Alternatively, the emulsifier F comprises an epoxide-functional polyoxyethylene homopolymers or epoxide-functional polyoxyethylene copolymers or an epoxide-functional sugar alcohols,
  in step b3, the emulsifier F is incorporated into an epoxy resin via an advancement reaction wherein a diepoxide, a dihydric aromatic compound, and the emulsifier F of step a3, are reacted in the presence of a phosphine or amine catalyst, and wherein the stoichiometry is chosen such that the advancement reaction product has epoxide end groups.

Sugar alcohols are compounds of formula HO—$CH_2$—[—CH(OH)]$_n$—$CH_2$—OH where n is an integer number of from 1 to 24, or ethers derived therefrom; commonly known compounds include glycerol, erythritol, threitol, arabitol, xylitol, ribitol, mannitol, sorbitol, galactitol, fucitol, iditol, inositol, volemitol, isomalt, maltitol, lactitol, maltotriitol, and maltotetraitol.

The modified epoxy based resin Pan comprising anionic and non-ionic groups is preferably prepared by mixing an at least partially neutralized anionically modified epoxy-based resin Pa and a non-ionically modified epoxy-based resin Pn. Preferably, the mixing ratio is chosen such that the mass ratio Pa/Pn is from 0.2/0.8 to 0.8/0.2.

Preferably the hydrophilically modified epoxy based resin P is a non-ionically modified epoxy based resin Pn; more preferably the hydrophilically modified epoxy based resin P is a non-ionically modified epoxy based resin Pn being (completely) free of anionic groups (i.e. comprising 0.0% of anionic groups).

The hydrophilically modified epoxy based resins P are obtained from petrochemical feedstock.

Alternatively and preferred, where possible, the hydrophilically modified epoxy based resins P are obtained from renewable feedstock. Particularly preferred renewable feedstocks are those extracted from wood biomass like lignin and tannins as well as cashew nut shell liquid (CNSL) which is a source for phenolic derivatives such as for example anarcadic acid, cardanol, cardol and 2-methyl cardol. Also preferred are feedstocks from lignocellulosic biomass such as cellulose and hemi-cellulose which are further depolymerized and dehydrated into 5-hydroxymethyl-2-furfural and then further derivatized to for example 2,5-furandicarboxylic acid or 2,5-furandimethanol. Other preferred feedstocks are terpenes and terpenoids such as limonene and carvacrol as well as other phenolic compounds like eugenol, ferulic and sinapic acid. Other renewable feedstocks for epoxy based resins are rosin acids (and their mono- and diglycidyl ethers), isosorbide (and its diglicidyl ether) as well as oligo- or polyglycerols (and their glycidyl ethers). Epoxide groups may also be introduced into the hydrophilically modified epoxy based resins P by epichlorohydrin derived in part or fully from (bio-)renewable glycerin. The exact amounts of bio-based carbon in these epoxy resins can be determined by the method described in ASTM D6866-20, wherein carbons resulting from contemporary biomass-based inputs are distinguished from those derived from fossil-based inputs, the bio-based carbon content being reported as the fraction of total organic carbon content (TOC). Other standardized methods to determine the fraction of renewable carbon are ISO 16620-2 and CEN 16640.

Another alternative method for reducing the carbon footprint of the hydrophilically modified epoxy based resins P of the invention is to use recycled monomers for the preparation thereof. Polymers, such as poly(bisphenol A carbonate), can be depolymerized to yield monomers (i.e. bisphenol A), which can then be further used to prepare the epoxy based resins of the present invention.

In yet another alternative, the hydrophilically modified epoxy based resins P are obtained from petrochemical feedstock and/or renewable feedstock, and/or derived from recycled monomers.

In the context of the present description, "bio-based carbon content" refers to bio-carbon content.

The crosslinker IB is a blocked isocyanate comprising the addition-reaction product of a polyisocyanate compound I and an isocyanate blocking agent B.

Polyisocyanate compounds I particularly suitable in blocked polyisocyanate IB include 1,4-tetramethylene diisocyanate, 1,6-hexamethylene diisocyanate, 2,2,4-trimethyl-1,6-hexamethylene diisocyanate, 2,4,4-trimethyl-1,6-hexamethylene diisocyanate, 1,12-dodecamethylene diisocyanate, cyclohexane-1,3- and -1,4-diisocyanate, 1-isocyanato-2-isocyanatomethyl cyclopentane, 1-isocyanato-3-isocyanatomethyl-3,5,5-trimethyl cyclohexane (isophorone diisocyanate or IPDI), bis(4-isocyanato cyclohexyl)methane, 1,3- and 1,4-bis(isocyanatomethyl)-cyclohexane, bis-(4-isocyanato-3-methyl-cyclo hexyl)-methane, alpha, alpha, alpha', alpha'-tetramethyl-1,3- and/or -1,4-xylylene diisocyanate, 1-isocyanato-1-methyl-4(3)-isocyanato methyl cyclohexane, 2,4- and/or 2,6-hexahydrotoluene diisocyanate, 1,3- and/or 1,4-phenylene diisocyanate, 2,4- and/or 2,6-tolulene diisocyanate, 2,4- and/or 4,4'-diphenylmethane diisocyanate, 1,5-diisocyanate naphthylene, 4,4',4"-triphenyl methane diisocyanate. Mixtures of diisocyanates can be used.

The blocked polyisocyanates IB can be obtained from petrochemical feedstock and/or renewable feedstock, and/or derived from recycled monomers. Preferably the blocked polyisocyanates IB are obtained from petrochemical feedstock and/or renewable feedstock.

Examples of suitable higher polyisocyanates are triphenylmethane-4,4',4"-triisocyanate, 1,2,4-benzene triisocyanate and polymethylene polyphenyl isocyanate. Suitable higher polyisocyanates can also be formed by dimerization of diisocyanates to form uretdiones or by trimerization to form isocyanurates. The reaction of urethanes with isocyanates to form allophanates, as well as the reaction of ureas with isocyanates to form biuret, can be used to generate higher polyisocyanates.

Isocyanate prepolymers, for example the reaction products of polyisocyanates with polyols (such as neopentyl glycol and trimethylol propane) or with polymeric polyols (such as polycaprolactone diols and triols), with an equivalent ratio of isocyanate groups over hydroxyl groups (NCO/OH) of greater than one, can also be used.

Preferred diisocyanates are 1,6-hexamethylene diisocyanate, 1,5-pentaethylene diisocyanate, isophorone diisocyanate, bis-(4-isocyanatocyclohexyl)-methane, 2,4- and/or 2,6-toluene diisocyanate, 2,4'- and/or 4,4'-diphenylmethane diisocyanate and alpha, alpha, alpha', alpha'-tetramethyl-1,3- and/or -1,4-xylylene diisocyanate, as well as oligomers of mentioned diisocyanates, preferably are 1,6-hexamethylene diisocyanate, isophorone diisocyanate, bis-(4-isocyanatocyclohexyl)-methane, 2,4- and/or 2,6-toluene diisocyanate, 2,4'- and/or 4,4'-diphenylmethane diisocyanate and alpha, alpha, alpha', alpha'-tetramethyl-1,3- and/or -1,4-xylylene diisocyanate, as well as oligomers of mentioned diisocyanates.

Alternatively and preferred, where possible, the polyisocyanates are obtained from renewable feedstock. A particularly preferred renewable feedstock is bio-based acetone (i.e. for the production of isophorone diisocyanate). Other preferred polyisocyanates derived in part from renewable feedstocks are for example 1,5-pentaethylene diisocyanate (and its trimer, also known under the trade name DESMODUR® eco N 7300), diisocyanates of the methyl or ethyl esters of I-lysine, isosorbide-based diisocyanates, furan based diisocyanate, bis(4-isocyanato-2-methoxyphenoxy) alkane, bis (4-isocyanato-2,6-dimethoxyphenoxy)alkane, 2,4-diisocyanato-1-pentadecylbenzene, di- and polyisocyanates based on fatty acids, dimer fatty acids and vegetable oils, 1-isocyanato-10-[(isocyanatomethyl)thio]decane and a product known under the tradename TOLONATE™ X FLO 100.

The blocking agent B is added to isocyanate groups of a polyisocyanate compound I to block the isocyanate groups, resulting in an urethane structure for the particular case of hydroxyl functional blocking agent B. If a stoichiometric excess of isocyanate over the blocking agents B is used, unreacted isocyanate can also react with the —NH group in the urethane group under formation of an allophanate structure.

The blocked polyisocyanate IB, in the form of an urethane structure or an allophanate structure, is stable at room temperature; however, the blocking agent B is dissociated to regenerate free isocyanate groups, when heated at the stoving temperature of a coating film, usually between 100 and 200° C.

Representative blocking agents B are derivatives selected from the group consisting of oximes, lactams, phenols, reactive methylene compounds, pyrazoles (or pyrazole derivatives), mercaptans, imidazoles, amines, imines, triazoles, hydroxyl amines, (aliphatic, cycloaliphatic or aromatic) mono-alcohols, and hydroxyl functional carbamates.

Preferred blocking agents B are aliphatic mono-alcohols, oximes, pyrazole derivates, reactive methylene compounds, or hydroxyl functional carbamates. More preferably, the blocking agents B are hydroxyl functional carbamates.

Suitable aliphatic mono-alcohols for use as blocking agents B include methanol, ethanol, 2-propanol, n-butanol, s-butanol, 2-ethylhexylalcohol, 1- or 2-octanol, nonylalcohol, 3,3,5-trimethylhexanol, decyl and lauryl alcohols, cyclopentanol, cyclohexylalcohol, benzylalcohol, 2,2,2-trifluoroethanol, 2,2,2-trichloroethanol, 2-(hydroxymethyl) furan, 2-methoxyethanol, methoxypropanol, 2-ethoxyethanol, n-propoxyethanol, 2-butoxyethanol, 2-ethoxyethoxyethanol, 2-ethoxybutoxyethanol, butoxyethoxyethanol, 2-butoxyethylethanol, 2-butoxyethoxy ethanol, N,N-dibutyl-2-hydroxyacetamide, N-hydroxysuccinimide, N-morpholine ethanol, 2,2-dimethyl-1,3-dioxolane-4-methanol, 3-oxazolidineethanol, 2-hydroxy methylpyridine, furfuryl alcohol, 12-hydroxystearic acid, triphenylsilanol, and 2-hydroxyethyl methacrylate, and ether-alcohols such as ethyleneglycol, 1,2-propylene glycol, mono-methylether, ethyleneglycol monobutyl ether, diethyleneglycol mono-methylether, or diethyleneglycol monobutyl ether.

Suitable cycloaliphatic mono-alcohols include, for example, cyclopentanol and cyclohexanol.

Suitable aromatic mono-alcohols include phenol, cresol, ethylphenol, n-propylphenol, isopropylphenol, n-butylphenol, s-butylphenol, t-butylphenol, n-hexylphenol, 2-ethylhexylphenol, n-octylphenol, n-nonylphenol, di-n-propylphenol, diisopropylphenol, isopropylcresol, di-n-butylphenol, di-s-butylphenol, di-t-butylphenol, di-n-octylphenol, di-2-ethylhexylphenol, di-n-nonylphenol, nitrophenol, bromophenol, chlorophenol, fluorophenol, dimethylphenol, styrenated phenol, methylsalicylate, 4-hydroxybenzoic acid methyl ester, 4-hydroxybenzoic acid benzyl ester, hydroxybenzoic acid 2-ethylhexyl ester, 4-[(dimethylamino) methyl]phenol, 4-[(dimethylamino) methyl] nonylphenol, bis(4-hydroxyphenyl) acetic acid, 2-hydroxypyridine, 2- or 8-hydroxyquinoline, and 2-chloro-3-pyridinol.

Preferably the mono-alcohol for being used as blocking agent B of the blocked isocyanate IB is an aliphatic mono-alcohol including hexanol, 2-ethylhexanol and ethylene glycol monoethyl ether.

Aliphatic diols, such as 1,2-ethylene glycol or 1,2-propylene glycol, are also preferred blocking agents B, 1,2-propylene glycol being more preferred with the primary hydroxyl group providing higher reactivity towards isocyanate than the secondary hydroxyl group.

Other preferred blocking agents B are glycol esters of acrylic or methacrylic acid. Particularly preferred is the use of 2-hydroxyethyl methacrylate as blocking agent B.

Suitable amines include dibutylamine, diphenylamine, aniline, N-methylaniline, carbazole, bis(2,2,6,6-tetramethylpiperidinyl) amine, di-n-propylamine, diisopropylamine, isopropylethylamine, 2,2,4-, or, 2,2,5-trimethylhexamethylene amine, N-isopropylcyclohexylamine, dicyclohexylamine, bis(3,5,5-trimethylcyclohexyl) amine, piperidine, 2,6-dimethylpiperidine, t-butylmethylamine, t-butylethylamine, t-butylpropylamine, t-butylbutylamine, t-butylbenzylamine, t-butylphenylamine, 2,2,6-trimethylpiperidine, 2,2,6,6-tetramethylpiperidine (dimethylamino)-2,2,6,6-tetramethyl piperidine, 2,2,6,6-tetramethyl-4-piperidine, 6-methyl-2-piperidine, and 6-amino caproic acid.

Suitable hydroxylamines include N,N-diethyl hydroxylamine.

Suitable imidazoles include imidazole, 2-methyl imidazole, 2-ethyl-4-methyl imidazole, 2-undecyl imidazole, 2-heptadecyl imidazole, and 2-ethyl imidazole.

Suitable imines include ethylene-imine, polyethylene-imine, 1,4,5,6-tetrahydropyrimidine, and guanidine.

Suitable triazoles include 1,2,4-triazole and benzotriazole.

Suitable mercaptans include butylmercaptan, dodecylmercaptan, and hexylmercaptan.

Suitable oximes include, for example, formaldoxime, acetaldoxime, acetone oxime, methylethylketone oxime (or methylethyl ketoxime), cyclohexanoneoxime, diacetyl monoxime, benzophenone oxime, 2,2,6,6-tetramethylcyclohexanoneoxime, diisopropylketoneoxime, methyl-t-butylketoneoxime, diisobutylketoneoxime, methylisobutylketoneoxime, methylisopropylketoneoxime, 2,4-dimethyl-3-pentanone oxime, methyl 2,4-dimethylpentylketoneoxime, methyl 3-ethylheptylketoneoxime, 2,6-dimethyl-4-heptanone oxime, methylisoamylketoneoxime, n-amylketoneoxime, 2,2,4,4-tetramethyl-1,3-cyclobutanedionemonooxime, 4,4'-dimethoxybenzophenone oxime, and 2-heptanoneoxime. Preferably the oxime is methylethyl ketoxime.

Suitable pyrazoles include pyrazole, 3,5-dimethylpyrazole, 3,5-diisopropylpyrazole, 3,5-diphenylpyrazole, 3,5-di-t-butylpyrazole, 3-methylpyrazole, 4-benzyl-3,5-dimethylpyrazole, 4-nitro-3,5-dimethylpyrazole, 4-bromo-3,5-dimethylpyrazole, 4-nitro-3,5-dimethylpyrazole and 3-methyl-5-phenylpyrazole. Preferably the pyrazole derivate is 3,5-dimethylpyrazole.

Suitable reactive methylene compounds include C1-C4 dialkyl malonic esters such as, for example, dimethyl malonate, diethyl malonate, diisopropyl malonate, di-n-butyl malonate, di-t-butyl malonate, di-2-ethylhexyl malonate, methyl n-butyl malonate, ethyl n-butyl malonate, methyl s-butyl malonate, ethyl s-butyl malonate, methyl t-butyl malonate, ethyl t-butyl malonate, diethyl methylmalonate, dibenzyl malonate, diphenyl malonate, benzylmethyl malonate, ethylphenyl malonate, t-butylphenyl malonate, isopropylidene malonate; alkyl acetoacetates such as, for example, methyl acetoacetate, ethyl acetoacetate, n-propyl acetoacetate, isopropyl acetoacetate, n-butyl acetoacetate, t-butyl acetoacetate, benzyl acetoacetate, phenyl acetoacetate, 2-acetoacetoxyethyl methacrylate, acetylacetone; and cyanoethyl acetate. Preferably the reactive methylene compound is diethyl malonate.

Suitable lactams include acetanilid, N-methylacetamide, acetic acid amide, epsilon-caprolactam, delta-valerolactam, gamma-butyrolactam, pyrrolidone, 2,5-piperazinedione, and laurolactam.

Preferably the hydroxyl functional carbamates C, for being used as blocking agent B of the blocked isocyanate IB, are obtained by the reaction of:
  cyclic organic carbonates, including propylene carbonate, ethylene carbonate, butylene carbonate, glycerine carbonate, allyloxymethyl carbonate and biscarbonates, made starting from the diglycidylethers of bisphenol A or of polypropylene glycol, preferably alkylene carbonates selected from the group consisting of ethylene carbonate, propylene carbonate and butylene carbonate, more preferably alkylene carbonates selected from the group consisting of ethylene carbonate and propylene carbonate, with
  aliphatic monoamines and/or diamines and/or triamines and/or tetraamines and/or alkanolamines, all these amines having primary amino groups and/or secondary amino groups and/or, if appropriate, tertiary reaction-inert amino groups, including cyclohexylamine, N-methylbutylamine, N-methylbenzylamine, piperidine, piperazine, morpholine, benzylamine, diethylentriamine, ethanolamine, diethanolamine and polyoxy alkylene amines and diamines, or with
  secondary amino compounds (alkanolamines) which have been obtained by reaction of 1 mole of aliphatic diamines having primary amino groups with 2 moles of monoepoxide compounds or with 2 moles of aliphatic monoamines having a primary amino group, and/or of aliphatic diamines having a primary and a tertiary reaction-inert amino group with 1 mole of diepoxide compounds. Mixtures of different amines can also be used.

More preferably the hydroxyl functional carbamate C, for being used as blocking agent B (of the blocked isocyanate IB), is the reaction product of ethylene carbonate or propylene carbonate and an alkanolamine.

Even more preferably the hydroxyl functional carbamate C is 2-hydroxyethyl bis(2-hydroxyethyl)carbamate or 2-hydroxypropyl bis(2-hydroxyethyl)carbamate.

In a preferred embodiment, the blocked isocyanate IB is made in a two-step reaction wherein in the first step, a difunctional isocyanate I is reacted with an organic hydroxy compound (mono-alcohol) having at least three hydroxyl groups to form a partially blocked isocyanate, wherein the equivalent ratio NCO/OH is not less than 3. In the following step, the partially blocked isocyanate is then reacted with blocking agent B, preferably aliphatic mono-alcohols, oximes, pyrazole derivates, reactive methylene compounds, and/or hydroxyl functional carbamates, to block all remaining isocyanate groups.

It is further preferred to use a chain-extended alcohol such as a reaction product of a trihydric or tetrahydric alcohol with a lactone, whereby a trihydric or tetrahydric alcohol is made where the hydroxyl groups of the molecule are separated by oligomeric or polymeric polylactone chains. A similar effect can be reached by reacting a trihydric or tetrahydric alcohol with methyloxiran (propylene epoxide), a reaction with ethylene oxide being less preferred as the oligomeric or polymeric oxyethylene chains render the coating more hydrophilic and impair the corrosion protection.

In another preferred embodiment, the blocked isocyanate IB is made by reacting polyisocyanates I with hydroxyl-functional carbamate C and other blocking agents, preferably aliphatic mono-alcohols, oximes, pyrazole derivates, and/or reactive methylene compounds.

The isocyanate groups of the polyisocyanate compound I for use in the aqueous dispersion D can be fully or only partially blocked by the blocking agent B. In the context of the present description, a fully (or completely) blocked polyisocyanate IB refers to a polyisocyanate compound I wherein all isocyanate groups are blocked with blocking agent B (so that there are no remaining free isocyanate groups in IB). A partially blocked polyisocyanate IB is a polyisocyanate compound I comprising isocyanate groups, preferably comprising on average maximum one isocyanate group per molecule of polyisocyanate compound I, being linked to the binder resin through reaction of said isocyanate group with the isocyanate reactive groups of said binder resin (the binder resin being comprised in a so-called binder, together with (co-)crosslinker(s)); the remaining isocyanate group(s) of polyisocyanate compound I being blocked by blocking agent B. The isocyanate groups of the partially blocked polyisocyanate IB thus consist of an isocyanate group (preferably on average maximum one isocyanate group per molecule 1) being reacted with the binder resin and an isocyanate group (or isocyanate groups) blocked with blocking agent B, so that there are no remaining free isocyanate groups in IB.

The partially blocked polyisocyanate IB can be readily prepared by reacting a polyisocyanate compound I having at least two isocyanate groups in the molecule with a blocking agent B in an amount sufficient to permit the resulting product to contain non-blocked isocyanate groups, preferably not more than one non-blocked isocyanate group, on average, per molecule I, said non-blocked isocyanate group being linked (or being bond) to the hydrophilically modified epoxy-based resin P through reaction of said isocyanate groups with the isocyanate reactive groups of P (said reactive groups of the binder resin, for example hydroxy groups, being able to react and covalently link with the non-blocked isocyanate group of the crosslinker).

The blocking agent B can be obtained from petrochemical feedstock and/or renewable feedstock.

The co-crosslinker E is preferably at least difunctional and is either
- a compound E1 having at least two hydroxyl groups that react with acid compounds present in the coating composition (prepared from the aqueous resin dispersion D, vide infra) at elevated temperature (above 80° C.) under ester formation and liberation of water, or
- an ester E2 with at least two ester groups formed by an at least dihydric alcohol E22 and an acid E21 which is unstable at elevated temperature (above 80° C.). The crosslinking reaction in this case is a metathesis reaction between the ester E2 and the acid compounds present in the coating composition, under formation of esters of the at least dihydric alcohol E22 and the said acid compounds, and liberation of the acid E21 which decomposes, in the case of a β-ketoacid E21, to a ketone and carbon dioxide. Useful compounds E2 have the general formula $(R^1-C(=O)-CR^2R^3-C(=O)-O-)_xR^4$, where $R^1$ is an alkyl group having from one to eight carbon atoms, $R^2$ and $R^3$ are independently from each other hydrogen or an alkyl group having from one to eight carbon atoms, and $R^4$ is the residue of an aliphatic alcohol having from two to four hydroxyl groups, and from two to forty carbon atoms; preferably E2 is selected from the group consisting of ethylene glycol bis-acetoacetate, diethylene glycol bis-acetoacetate, propylene glycol bis-acetoacetate, 1,4-butanediol bis-acetoacetate, 2,2,4-trimethylpentanediol bis-acetoacetate; and the bis-acetoacetate of a mixture of dimer fatty alcohols, glycerol tris-acetoacetate, trimethylolpropane tris-acetoacetate; and the corresponding diesters of 3-oxovaleric acid, 3-oxocaproic acid, 3-oxoenanthic acid, 2-methyl acetoacetic acid, 2,2-dimethyl acetoacetic acid, 2-ethyl acetoacetic acid, and 2-methyl-2-ethyl acetoacetic acid. In the coating composition, acid groups can be present in the binder components or in additives, particularly rheological additives, or adjuvants such as catalysts and biocides.

A preferred example of compounds E1 is a beta-hydroxyalkylamide of the formula:

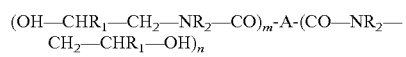

wherein:
$R_1$ is hydrogen or C1-C5 alkyl;
$R_2$ is hydrogen, C1-C5 alkyl or $CH_2-CHR_1-OH$;
A is a chemical bond or a polyvalent organic radical derived from saturated, unsaturated or aromatic hydrocarbon radicals including substituted hydrocarbon radicals containing from 2 to 20 carbon atoms; and
m is an integer having a value of 1 to 2; m is an integer having a value 0 to 2, and m+n is at least 2.

Suitable beta-hydroxyalkylamides are described in the literature, for example those mentioned in the U.S. Pat. Nos. 4,727,111; 4,788,255; 4,076,917; 5,266,628; EP 322834 and EP 473380.

More preferably compound E1 is a beta-hydroxyalkylamide of the formula:

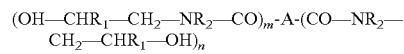

wherein:
$R_1$ is hydrogen or C1 alkyl;
$R_2$ is $CH_2-CHR_1-OH$;
A is a saturated hydrocarbon radical containing 4 carbon atoms; and
m equals 1 and n equals 1.

Most preferably compound E1 is N,N,N',N'-tetrakis-(2-hydroxyethyl)-adipamide, known under the tradename PRIMID® XL552, or N,N,N',N'-tetrakis-(2-hydroxypropyl)-adipamide, known under the tradename PRIMID® QM1260.

The co-crosslinker E can be obtained from petrochemical feedstock and/or renewable feedstock.

Coating compositions of the present invention are prepared from the aqueous resin dispersion D comprising a mixture of a hydrophilically modified epoxy-based resin P, a blocked isocyanate IB, and a co-crosslinker E.

Preferably aqueous resin dispersions D of the present invention comprise:
between 40 and 90% by weight, more preferably between 45 and 85% by weight of hydrophilically modified epoxy-based resin P;
between 5 and 55% by weight, more preferably between 10 and 50% by weight of blocked isocyanate crosslinker IB; and
between 0.1 and 5% by weight, preferably between 1 and 3% by weight of co-crosslinker E;
based on the total weight of P, IB and E (wherein the sum of weight percentages (% by weight) of P, IB and E does not exceed 100%).

More preferably aqueous resin dispersions D of the present invention comprise:
between 40 and 90% by weight, more preferably between 45 and 85% by weight of hydrophilically modified epoxy-based resin P being a non-ionically modified epoxy-based resin Pn;
between 5 and 55% by weight, more preferably between 10 and 50% by weight of a blocked isocyanate crosslinker IB; and
between 0.1 and 5% by weight, preferably between 1 and 3% by weight of co-crosslinker E being a beta-hydroxyalkylamide E1;
based on the total weight of P, IB and E1 (wherein the sum of weight percentages (% by weight) of Pn, IB and E1 does not exceed 100%).

Preferably one or more co-solvents are added selected from the group consisting of an aliphatic alcohol, ketones, esters, glycols, glycol ethers, and glycol esters, and mixtures thereof; and one or more additives are added preferably selected from the group consisting of defoamers, levelling agents, coalescing agents, flow modifiers, biocides, pigments, and rheological additives. Wetting agents and anti-settling agents can also be added if pigmented coating compositions are prepared.

Representative alcohols include ethanol, n-propanol, isopropanol, n-butanol and iso-butanol; representative ketones include acetone, 2-butanone, cyclohexanone, methyl aryl ketones, ethyl aryl ketones and methyl isoamyl ketones; representative esters include ethyl acetate and butyl acetate; representative glycols include ethylene glycol and propylene glycol; representative glycol ethers include ethylene glycol monomethyl ether, ethylene glycol monoethyl ether, ethylene glycol monobutyl ether, propylene glycol monomethyl ether and methoxypropanol; representative glycol esters include butyl glycol acetate and methoxypropyl acetate.

Preferably the coating composition comprises between 35 and 55% by weight, more preferably between 40 and 50% by weight of non-volatile compounds and from 45 to 65% by weight, more preferably between 50 and 60% by weight of water and co-solvents selected from the group consisting of alcohols, ketones, esters, glycols, glycol ethers, and glycol esters, and mixtures thereof Preferably one or more crosslinking catalyst(s) is (are) added to the coating composition, said crosslinking catalyst being selected from the group consisting of salts, chelate compounds and organometallic compounds of elements of groups 4, 7, 8, 9, 12, 13, 14 and 15 and of period 4, 5 and 6 of the periodic table of elements according to the new IUPAC naming system, and strong amines.

Preferred are compounds that are well soluble in water, such as salts of these elements that dissociate into ions, in an aqueous system, and chelate compounds of these elements, where the chelate former may be an organic hydroxy acid such as lactic acid, 2,2-bishydroxymethyl propionic acid, an amino acid such as N,N,N',N'-ethylenediamine tetraacetic acid, nitrilotriacetic acid, and beta-alanine, or a multifunctional amine or a hydroxyamine. Other useful compounds are organometallic compounds such as alkoxy metal oxides, and metal salt of organic acids or hydroxy acids. Particularly preferred are the methane sulphonates, lactates and bishydroxymethyl-propionates of bismuth, tin, lead, and titanium.

Strong amines are more preferably tertiary amines and most preferably (multi)cyclic tertiary amines like 1,8-diazabicyclo[5.4.0]undec-7-ene (DBU) and 1,4-diazabicyclo[2.2.2]octane (DABCO).

The coating composition preferably comprises up to 5% by weight of one or more crosslinking catalysts, based on the hydrophilically modified epoxy-based resin P comprising the blocked isocyanate crosslinker IB and the co-crosslinker E.

The coating compositions may comprise one or more organic and inorganic pigments and optionally one or more fillers.

Examples of inorganic pigments are iron oxide pigments, titanium oxide pigments, zinc oxide pigments, chromium oxide pigments co-precipitated with nickel and nickel titanates, yellow pigments from lead sulphochromate or lead bismuth vanadate, orange pigments from lead sulphochromate molybdate, and carbon black.

Examples of suitable organic pigments are azo pigments, metal complex pigments, anthraquinonoid pigments, phthalocyanine pigments, polycyclic pigments, especially those of the thioindigo, quinacridone, dioxazine, pyrrolo, naphthalenetetracarboxylic acid, perylene, isoamidolin(on)e, flavanthrone, pyranthrone, or isoviolanthrone series.

Examples of useful fillers are kaolin, talc, mica, other silicates, quartz, cristobalite, wollastonite, perlites, diatomaceous earth, fiber fillers, aluminum hydroxide, barium sulfate, or calcium carbonate.

In a method of the present invention, the aqueous resin dispersion D of the invention comprising the mixture of a hydrophilically modified epoxy-based resin P, a blocked isocyanate crosslinker IB, and a co-crosslinker E is transferred to a blender, such as a high-speed stirrer, a planetary mixer or a ball mill grinder and water, co-solvent, additives, pigments and fillers are added. Blending is performed for at least 5 minutes, until a uniformly blend (or coating composition) is obtained.

The coating composition of the invention is preferably applied on a metal substrate, more preferably on a corrosion resistant pretreated metal substrate, even more preferably on an iron phosphated or zinc phosphated steel or on pretreated steel comprising a zirconium-, vanadium-, titanium- or silane-based conversion coating.

The coating composition may be applied on the substrate using any suitable procedure known in the art, and is preferably applied by spray or dip coating.

Water and optional co-solvents are then flashed off, at a temperature of at least 20° C. for at least 1 minute, preferably at a temperature of at least 20° C. for at least 5 minutes, after which stoving is performed in an air ventilated convection oven at a temperature of at least 140° C., preferably comprised between 140 to 230° C., more preferably between 150 and 220° C., even more preferably between 160 and 210° C., most preferably between 170 and 200° C., for a period of at least 20 seconds, preferably of from 1 to 25 minutes, more preferably of from 2 to 20 minutes, even more preferably of from 4 to 18 minutes, still even more preferably of from 6 to 15 minutes, most preferably from 8 to 12 minutes.

Alternatively the coating may be cured by InfraRed irradiation, such as near, short or medium infrared, or by induction or by a combination thereof. In the embodiment where infrared or induction systems are used, the stoving cycle is within the range comprised between 2 and 160 seconds, depending on the heating system or the combination of heating systems.

EXAMPLES

Example 1: Synthesis of a Blocked Isocyanate Crosslinker 190 g of a hydroxycarbamate from diethanolamine and propylene carbonate were made in a known manner (according to EP0476514: Table 1, HC 2). 470 g of butyldiglycole and 0.4 g bismuth neodecanoate (28% Bi metal) were added at 30° C. and homogenized. 690 g of oligomeric diphenylmethane-diisocyanate (with an isocyanate content of 32.0%, according to DIN EN ISO 11909) was added stepwise to maintain a temperature of less than 100° C. When the amount of free isocyanate was determined (by titration) to be less than 0.1%, the product was diluted in 80 g methoxypropanol and 60 g deionized water. The resulting product had a solids content of 90.2% (sample of 1 g, dried at 125° C. for 10 min) and a dynamic viscosity of 12500 mPa·s (measured at 23° C., with a shear rate of 25 $s^{-1}$).

Example 2: Preparation of a Blocked Isocyanate Non-Ionic Dispersion 2.1.: Preparation of a Hydrophilic Epoxy Resin.

1 kg of polyethylene glycol PEG 4000 (average molar mass approximately 4000 g/mol) were heated to 120° C., and dissolved water was removed by distillation under reduced pressure and a flow of nitrogen. 110 g of bisphenol A diglycidylether and, thereafter, 1.7 g of an aqueous solution of tetrafluoroboric acid with a mass fraction w(HBF$_4$) in the solution of 50%, were added. When a constant value of specific content of epoxide groups was reached (approximately 0.1 mole/kg to 0.2 mole/kg), 1100 g of water were added to dilute to a mass fraction of solids of approximately 50%.

2.2.: Advancement Reaction.

Into a reaction vessel equipped with a thermometer, a stirrer, a reflux condenser, a descending condenser, and a pump for reducing the pressure, 2400 g of bisphenol A diglycidylether, 720 g of bisphenol A, and 1200 g of the hydrophilic epoxy resin of Example 2.1 were charged and heated to 125° C. under stirring to remove all volatile components at a reduced pressure of 10 kPa (100 mbar). 1.3 g of triphenylphosphine were then added, and the temperature was further increased to 160° C. and the mixture was kept under stirring until a specific amount of epoxide groups of 1.87 equivalent/kg (an "epoxide equivalent weight" of 534 g/equivalent) was reached.

2.3.: Addition of the Blocked Isocyanate and Dispersion in Water.

The reaction mass obtained in Example 2.2. was then cooled down to 120° C., and 729 g of the blocked isocyanate from Example 1 was added. The viscosity was then reduced by adding 410 g of methoxypropanol, and the solution was cooled to 80° C. 1200 g of deionised water was then added to the reaction vessel, and the mixture was dispersed for three hours at 70° C. to get a water-dilutable resin dispersion. Further, 3500 g of deionised water was added to the vessel over the course of two hours, and finally the mass fraction of solids was adjusted by adding further deionised water to 42.1% (sample of 1 g, dried at 125° C. for 10 min), decreasing the viscosity to 1070 mPa·s (measured at 23° C., with a shear rate of 100 s$^{-1}$). The resulting Z-average particle size (Z-average mean according to ISO22412) was 246 nm.

Example 3: Preparation of a Blocked Isocyanate Non-Ionic Dispersion 3.2.: Advancement Reaction.

Into a reaction vessel equipped with a thermometer, a stirrer, a reflux condenser, a descending condenser, and a pump for reducing the pressure, 2400 g of bisphenol A diglycidylether, 670 g of bisphenol A, and 1750 g of the hydrophilic epoxy resin of Example 2.1. were charged and heated to 125° C. under stirring to remove all volatile components at a reduced pressure of 10 kPa (100 mbar). 1.3 g of triphenylphosphine was then added, and the temperature was further increased to 160° C. and the mixture was kept under stirring until a specific amount of epoxide groups of 1.96 equivalent/kg (an "epoxide equivalent weight" of 510 g/equivalent) was reached.

3.3.: Addition of Blocked Isocyanate and Dispersion in Water.

The reaction mass obtained in Example 3.2. was then cooled down to 120° C., and 2945 g of the blocked isocyanate from Example 1 was added. The viscosity was then reduced by adding 410 g of methoxypropanol, and solution was cooled to 80° C. 1850 g of deionised water was then added to the reaction vessel, and the mixture was dispersed for three hours at 70° C. to get a water-dilutable resin dispersion. Further, 5000 g of deionised water was added to the vessel over the course of two hours, and finally the mass fraction of solids was adjusted by adding further deionised water to 42.3% (sample of 1 g, dried at 125° C. for 10 min), decreasing the viscosity to 930 mPa·s (measured at 23° C., with a shear rate of 100 s$^{-1}$). The resulting Z-average particle size (Z-average mean according to ISO22412) was 244 nm.

Comparative Example 1: Synthesis of a Resole Crosslinker

In a reaction vessel equipped with a thermometer, a stirrer, a reflux condenser, a descending condenser and a device for reducing the pressure, 453.6 g of n-butanol were heated up to 50° C. Then, 397.3 g of bisphenol A, 48.5 g of sodium hydroxide solution (having a mass fraction of solids of 45%), 357.6 g of aqueous formaldehyde solution (having a mass fraction of dissolved formaldehyde of 37%), and 95.4 g of paraformaldehyde were added and reacted for ten hours at 50° C. Thereafter, further 447 g of n-butanol were added, and the pH adjusted to 3.5 by adding 72.2 g of an aqueous solution of phosphoric acid (having a mass fraction of dissolved phosphoric acid of 75%). Azeotropic distillation was conducted at atmospheric pressure and a temperature of from 94° C. to 105° C. for eight hours in order to strip off the water phase. The residual n-butanol was then stripped off at 120° C. Further, 212 g of n-butanol was added, followed by a second azeotropic distillation at atmospheric pressure for five hours. Remaining n-butanol was also stripped off to reach a distillation temperature of 115° C. with further water stripped off by azeotropic distillation until compatibility of the reaction mass with n-heptane was reached at a ratio of resin to n-heptane of 1:2. Salt was removed by washing the resin obtained with 187 g of deionised water. Residual water was removed by azeotropic distillation at atmospheric pressure and a temperature of 105° C. followed by the removal of all volatile components at 85° C. and a reduced pressure of 10 kPa (100 mbar). The resulting polymeric resin was dissolved in methoxypropanol to a solution with a mass fraction of solids of 80% (mass of sample: 1 g, drying conditions: 60 min, 125° C.) and a dynamic viscosity of 1200 mPa·s at 23° C.

Comparative Example 2: Preparation of a Resole Modified Non-Ionic Dispersion

The hydrophillic epoxy resin was prepared according to Example 2.1. and 2.2. The obtained reaction mass was then cooled down to 120° C., and 820 g of the phenolic resin from Comparative Example 1 was added. The viscosity was then reduced by adding 318 g of methoxypropanol, and the solution was cooled to 80° C. 1130 g of deionised water was then added to the reaction vessel, and the mixture was dispersed for three hours at 70° C. to get a water-dilutable resin dispersion. Further, 3500 g of deionised water was added to the vessel over the course of two hours, and finally the mass fraction of solids was adjusted by adding further deionised water to 41.8% (sample of 1 g, dried at 125° C. for 10 min), decreasing the viscosity to 1020 mPa·s (measured at 23° C., with a shear rate of 100 s$^{-1}$). The resulting Z-average particle size (Z-average mean according to ISO22412) was 220 nm.

Example 4: White Mono-Coat Preparation and Application to Steel Panels 4.1.: Pigment Paste, Dispersed in Water on Bead Mill.

A pigment paste was obtained by dispersing the components as shown in table 1 in water on a bead mill.

TABLE 1

| ADDITOL ® VXW 6208 | 6.40 g | Dispersing Additive (Allnex Austria GmbH) |
| KRONOS ® 2190 | 102.35 g | Titanium Dioxide Pigment (Kronos International, Inc.) |
| NUBIROX 102 | 14.35 g | Organophilised Zinc Phosphate and Zinc Molybdate (Ferro Corp.) |
| Blanc fixe micro | 13.05 g | Barium Sulphate (Solvay S.A.) |
| Talc | 29.35 g | MICROTALC ® IT extra (Mondo Minerals B.V.) |
| Deionised water | 40.00 g | |

4.2.: Coating Compositions

In table 2, the components of the coating compositions according to the invention (Example 5 to 10) and according to the state of the art (Examples 11 to 13 being Comparative Examples) are represented, wherein:

DOWANOL™ DPnB is n-Butoxypropoxypropanol;

ADDITOL® VXW 6393 is a Mineral oil based defoamer (Allnex Austria GmbH);

RHEOVIS® AS 1130 is an Acrylic HASE thickener (acid number 90 mg/g, based on form of delivery; BASF SE);

PRIMID® XL 552 is N,N,N',N'-Tetrakis(2-hydroxyethyl)-adipamide (Ems Chemie AG), 20% weight dissolved in water.

Example 14: Anti-Corrosion and Color Performance

After seven days of conditioning at 23° C. and 50% relative humidity, the color of coated panels of each coating composition from Example 5 to 13 were measured using a colorimeter "Spectro-guide" (Byk Gardner GmbH). A high value of "b" according to the CIE L*a*b* system indicates strong yellowing (discolouration) of the coating film. Then the panels were scratched in the middle of the panel and exposed to salt spray chamber test ("SST"; DIN EN ISO 9227). Blistering of the artificially aged panels was documented according to DIN EN ISO 4628-2.

In table 3, the color and blistering after exposure to the Salt Spray Test are represented.

Resins of Comparative Example 2 and Example 2 according to the invention have a comparable amount of crosslinker (resole or blocked isocyanate, respectively) based on the amount of epoxy resin. The direct comparison between coating composition of Ex. 5 and CEx. 11, Ex. 6 and CEx. 12, as well as of Ex. 7 and CEx. 13 show that the corrosion performance of Comparative Examples 11 to 13 is on the same level as for Examples 5 to 7 (coating compositions according to the invention). It is also clearly demonstrated that the addition of a β-hydroxyalkylamide to the anticorrosion monocoat significantly improves the anti-corrosive effect in all cases. However, in addition to the maintained anti-corrosion performance, all the coating compositions according to the invention based on blocked isocyanates (Ex. 5 to Ex. 10) show a much lighter color (smaller b-value)

TABLE 2

| | Ex. 5 | Ex. 6 | Ex. 7 | Ex. 8 | Ex. 9 | Ex. 10 | CEx. 11 | CEx. 12 | CEx. 13 |
| --- | --- | --- | --- | --- | --- | --- | --- | --- | --- |
| Resin of Comp. Ex. 2 | | | | | | | 50.00 | 50.00 | 50.00 |
| Resin of Ex. 2 | 49.50 | 49.50 | 49.50 | | | | | | |
| Resin of Ex. 3 | | | | 49.3 | 49.3 | 49.3 | | | |
| DOWANOL ™ DPnB | 2.50 | 2.50 | 2.50 | 2.50 | 2.50 | 2.50 | 2.50 | 2.50 | 2.50 |
| RHEOVIS ® AS 1130 | 2 | 4 | 2 | 2 | 4 | 2 | 2 | 4 | 2 |
| ADDITOL ® VXW 6393 | 1.00 | 1.00 | 1.00 | 1.00 | 1.00 | 1.00 | 1.00 | 1.00 | 1.00 |
| PRIMID ® XL 552 | 1.29 | 2.58 | | 1.29 | 2.58 | | 1.29 | 2.58 | |
| Deionized water | 6.00 | 6.00 | 6.00 | 6.00 | 6.00 | 6.00 | 6.00 | 6.00 | 6.00 |
| Pigment paste from Table 1 | 35 | 35 | 35 | 35 | 35 | 35 | 35 | 35 | 35 |
| Deionized water | 6.00 | 6.00 | 6.00 | 6.00 | 6.00 | 6.00 | 6.00 | 6.00 | 6.00 |
| Sum: | 103.29 | 106.58 | 102.00 | 103.09 | 106.38 | 101.80 | 103.79 | 107.08 | 102.50 |
| Dyn. Viscosity, mPa · s | 504 | 659 | 530 | 354 | 347 | 412 | 312 | 700 | 586 |
| total solids, % | 45.1% | 44.5% | 45.4% | 45.2% | 44.6% | 45.5% | 44.9% | 44.4% | 45.2% |
| P/B Ratio | 130.0% | 130.0% | 130.0% | 130.0% | 130.0% | 130.0% | 130.0% | 130.0% | 130.0% |

The components as disclosed in Table 2 were mixed in the given sequence with a laboratory blender. Twenty-four hours after blending the coating compositions of example 5 to 13 were applied onto zinc-phosphated steel plates (GARDOBOND® 26S 6800 OC, Chemetall GmbH) by pneumatic spray gun. After ten minutes of flash off at 23° C., the coated plates were cured for ten minutes at 180° C. The dry film thickness of the coatings was 35 µm in each case.

at the same pigment/binder ratio of 130% (weight by weight) then the ones based on resole (CEx. 11 to CEx. 13). In the context of the present description, the pigment/binder ratio refers to the sum of pigments and fillers (by weight) divided by the sum of solid binder resin and blocked isocyanate crosslinker (by weight) expressed as percentage; solid contents of additives and co-crosslinker are not taken into account.

TABLE 3

|  | Ex. 5 | Ex. 6 | Ex. 7 | Ex. 8 | Ex. 9 | Ex. 10 | CEx. 11 | CEx. 12 | CEx. 13 |
|---|---|---|---|---|---|---|---|---|---|
| b-value | 1.27 | 0.66 | 1.12 | 2.16 | 3.27 | 2.55 | 5.74 | 4.21 | 7.02 |
| Blistering after 168 h | 1-2(S2) | 1-2(S2) | 3(S3) | 3(S2) | 2-3(S2) | 4(S2) | 1-2(S2) | 2(S2) | 3(S2) |
| Blistering after 336 h | 2(S2) | 1-2(S2) | 3(S3-4) | 3-4(S3) | 2-3(S3) | 4(S3) | 1-2(S2-3) | 2(S2-3) | 4(S2-3) |

The invention claimed is:

1. An aqueous resin dispersion D comprising a mixture of a hydrophilically modified epoxy-based resin P, a blocked isocyanate crosslinker IB, and a co-crosslinker E;
wherein the hydrophilically modified epoxy-based resin P comprises 1-hydroxy-2-phenoxy-ethyl groups;
and wherein the co-crosslinker E is selected from the group consisting of
a compound E1 having at least two hydroxyl groups that react with acid compounds present in the coating composition at elevated temperature above 80° C. under ester formation and liberation of water, and
an ester E2 with at least two ester groups formed by an at least dihydric alcohol E22 and an acid E21 which acid is unstable at elevated temperature above 80° C.

2. The aqueous resin dispersion D according to claim 1, wherein the blocked isocyanate crosslinker IB is the reaction product of:
a polyisocyanate and a mono-alcohol, or
a polyisocyanate and an oxime, or
a polyisocyanate and a pyrazole derivative, or
a polyisocyanate and a reactive methylene compound, or
a polyisocyanate and a lactam, or
a polyisocyanate and a phenol, or
a polyisocyanate and a mercaptan, or
a polyisocyanate and an imidazole, or
a polyisocyanate and an amine, or
a polyisocyanate and an imine, or
a polyisocyanate and a triazole, or
a polyisocyanate and a hydroxyl amine, or
a polyisocyanate and a hydroxyl functional carbamate C, or
a polyisocyanate and a hydroxyl functional carbamate C and a mono-alcohol and/or an oxime and/or a pyrazole derivative and/or a reactive methylene compound, and/or a lactam, and/or a phenol, and/or a mercaptan, and/or an imidazole, and/or an amine, and/or an imine, and/or a triazole, and/or a hydroxyl amine.

3. The aqueous dispersion D according to claim 2, wherein the hydroxyl functional carbamate C is the reaction product of cyclic organic carbonates with aliphatic monoamines, diamines, triamines, tetraamines and/or alkanolamines, said amines having at least primary or secondary amino groups.

4. The aqueous dispersion D according to claim 3, wherein the alkanolamines are the reaction product of:
1 mole of aliphatic diamines having primary amino groups with 2 moles of monoepoxide compounds or with 2 moles of aliphatic monoamines having a primary amino group, and/or of
aliphatic diamines having a primary and a tertiary reaction-inert amino group with 1 mole of diepoxide compounds.

5. The aqueous dispersion D according to claim 2, wherein the hydroxyl functional carbamate C is the reaction product of ethylene carbonate or propylene carbonate and an alkanolamine.

6. The aqueous dispersion D according to claim 2, wherein the hydroxyl functional carbamate C is 2-hydroxyethyl bis(2-hydroxyethyl)carbamate or 2-hydroxypropyl bis(2-hydroxyethyl)carbamate.

7. The aqueous resin dispersion D according to claim 1, wherein the blocked isocyanate crosslinker IB is the reaction product of a polyisocyanate and a hydroxyl functional carbamate C.

8. The aqueous resin dispersion D according to claim 1, wherein the blocked isocyanate crosslinker IB is a partially blocked polyisocyanate comprising on average maximum one isocyanate group per molecule of polyisocyanate compound I, being linked to the hydrophilically modified epoxy-based resin P through reaction of said isocyanate group with isocyanate reactive groups of P; the remaining isocyanate group(s) of polyisocyanate compound I being blocked by blocking agent B.

9. The aqueous resin dispersion D according to claim 1, wherein the co-crosslinker E is E1, E1 being a beta-hydroxyalkylamide having the formula:

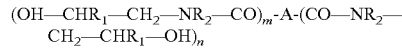

wherein:
$R_1$ is hydrogen or C1-C5 alkyl;
$R_2$ is hydrogen, C1-C5 alkyl or $CH_2$—$CHR_1$—OH;
A is a chemical bond or a polyvalent organic radical derived from saturated, unsaturated or aromatic hydrocarbon radicals including substituted hydrocarbon radicals containing from 2 to 20 carbon atoms; and
m is an integer having a value of 1 to 2; m is an integer having a value of 0 to 2, and m+n is at least 2.

10. The aqueous resin dispersion D according to claim 1, wherein the co-crosslinker E is E1, E1 being a beta-hydroxyalkylamide having the formula:

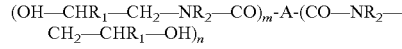

wherein:
$R_1$ is hydrogen or C1 alkyl;
$R_2$ is $CH_2$—$CHR_1$—OH;
A is a saturated hydrocarbon radical containing 4 carbon atoms; and
m equals 1 and n equals 1.

11. The aqueous resin dispersion D according to claim 1, wherein the co-crosslinker E is E1, E1 being N,N,N',N'-tetrakis-(2-hydroxyethyl)-adipamide or N,N,N',N'-tetrakis-(2-hydroxypropyl)-adipamide.

12. The aqueous resin dispersion D according to claim 1, wherein the hydrophilically modified epoxy-based resin P is a non-ionically modified epoxy-based resin Pn.

13. The aqueous dispersion D according to claim 12, wherein the non-ionically modified epoxy based resin Pn is the reaction product of a diepoxide, a dihydric aromatic compound and an epoxy-functional non-ionic emulsifier F and is characterized by an epoxide equivalent weight (EEW) comprised between 200 and 2,000 g/equiv.

14. The aqueous dispersion D according to claim 13, wherein the epoxy functional non-ionic emulsifier F is;

an epoxide functional polyoxyalkylene homopolymer or copolymer; and/or an epoxide functional sugar alcohol; and/or the reaction product of a hydroxyl functional polyoxyalkylene homopolymer or copolymer or a sugar alcohol segment with an at least difunctional epoxide compound;

wherein:

the polyoxyalkylene homopolymer is polyoxyethylene or polyoxypropylene;

the polyoxyalkylene copolymer is a polyoxyethylene-propylene copolymer;

the polyoxyalkylene homopolymers and copolymers comprise from 20 to 150 C2-C3 oxyalkylene units.

15. The aqueous resin dispersion D according to claim 1 comprising:

between 40 and 90% by weight of hydrophilically modified epoxy-based resin P;

between 5 and 55% by weight of blocked isocyanate crosslinker IB; and between 0.1 and 5% by weight of co-crosslinker E;

based on the total weight of P, IB and E.

16. The aqueous resin dispersion D according to claim 1 comprising:

between 40 and 90% by weight of hydrophilically modified epoxy-based resin P being a non-ionically modified epoxy-based resin Pn;

between 5 and 55% by weight of a blocked polyisocyanate crosslinker IB; and between 0.1 and 5% by weight of co-crosslinker E being a beta-hydroxyalkylamide E1;

based on the total weight of Pn, IB and E1.

17. The aqueous resin dispersion D according to claim 1 comprising one or more catalyst(s) selected from the group consisting of:

salts of elements of groups 4, 7, 8, 9, 12, 13, 14 and/or 15 and/or of period 4, 5 and/or 6 of the periodic table of elements according to the new IUPAC naming system, chelate compounds of elements of groups 4, 7, 8, 9, 12, 13, 14 and/or 15 and/or of period 4, 5 and/or 6 of the periodic table of elements according to the new IUPAC naming system, organometallic compounds of elements of groups 4, 7, 8, 9, 12, 13, 14 and/or 15 and/or of period 4, 5 and/or 6 of the periodic table of elements according to the new IUPAC naming system, and tertiary amines.

18. The aqueous resin dispersion D according to claim 1, wherein the hydrophilically modified epoxy-based resin P and/or the blocked isocyanate crosslinker IB are obtained from renewable feedstock and in total have a bio-based carbon content of more than 20% by weight of total carbon content of epoxy-based resin P and blocked isocyanate crosslinker IB, the bio-carbon content being determined using the ASTM D6866-20 standard, or wherein the epoxy-based resin P and/or the blocked isocyanate crosslinker IB are derived from recycled monomers.

19. A coating composition comprising the aqueous resin dispersion D according to claim 1 and one or more additives selected from the group consisting of defoamers, levelling agents, coalescing agents, flow modifiers, biocides, pigments, rheology additives, and wetting agents.

20. The coating composition according to claim 19 comprising between 35 and 55% by weight of non-volatile compounds and from 45 to 65% by weight of water and co-solvents selected from the group consisting of alcohols, ketones, esters, glycols, glycol ethers, and glycol esters, and mixtures thereof.

21. A method for producing a coated metal substrate comprising the subsequent steps of:

applying the coating composition of claim 19 on at least one side of the optionally pretreated and/or primer-comprising metal substrate, at a coating thickness adjusted to obtain a dry coating thickness of at least 10 µm;

flashing off water and co-solvents at a temperature of at least 20° C. for at least 1 minute;

stoving the applied coating composition at a temperature of at least 100° C. for a period of at least 20 seconds, to form the metal substrate coated with a cross-linked coating layer.

22. Use of the coating composition according to claim 19, for coating a metal substrate.

* * * * *